United States Patent [19]

Rieger et al.

[11] Patent Number: 4,905,782
[45] Date of Patent: Mar. 6, 1990

[54] STEERING VALVE FOR VEHICLES

[75] Inventors: Wolfgang Rieger, Reichenbach-Donzdorf; Werner Breitweg, Schwäbisch Gmünd-Bargau, both of Fed. Rep. of Germany

[73] Assignee: Zahnradfabrik Friedrichshafen, AG., Friedrichshafen, Fed. Rep. of Germany

[21] Appl. No.: 273,037
[22] PCT Filed: Jan. 15, 1987
[86] PCT No.: PCT/EP87/00016
§ 371 Date: Aug. 18, 1988
§ 102(e) Date: Aug. 18, 1988
[87] PCT Pub. No.: WO87/04678
PCT Pub. Date: Aug. 13, 1987

[51] Int. Cl.⁴ .......................... B62D 5/08; F16F 1/14
[52] U.S. Cl. ................... 180/141; 91/375 A; 137/625.21; 180/149
[58] Field of Search ............... 180/136, 132, 143, 146, 180/148, 149; 137/625.21; 91/375 A

[56] References Cited
U.S. PATENT DOCUMENTS

| 4,198,898 | 4/1980 | Elser | 91/375 A |
| 4,294,325 | 10/1981 | Nomura | 180/148 |
| 4,387,737 | 6/1983 | Tobiasz | 137/625.21 |
| 4,678,052 | 7/1987 | Suzuki et al. | 180/143 |
| 4,715,464 | 12/1987 | Nakamura et al. | 180/143 X |
| 4,796,715 | 1/1989 | Futaba et al. | 91/375 A X |

FOREIGN PATENT DOCUMENTS 1386510  4/1988  U.S.S.R. .......................... 180/149

Primary Examiner—Mitchell J. Hill
Attorney, Agent, or Firm—Albert M. Zalkind

[57] ABSTRACT

A steering valve for vehicles has a torque input member for connection to a steering wheel and connects through a torque rod to an output shaft, having coacting valving components operated by relative rotation during the initial torque stress on the steering wheel between the input member and the output shaft in order to control flow to and from the servomotor. The torque rod has an average reduced cross section and is particularly manufactured to take torque stress for simulation of steering resistance. The torque rod has end connecting members and a connecting member can be utilized to effect a shorter overall length of the torque rod which determines the overall length of the steering valve as well as affording support. Thus, one such connecting member adjacent the output shaft is elongated as a bearing for the valving component rotated by the steering wheel, and also has a return flow throttling port for pressure reduction of return flow to quiet the noise of such flow.

12 Claims, 1 Drawing Sheet

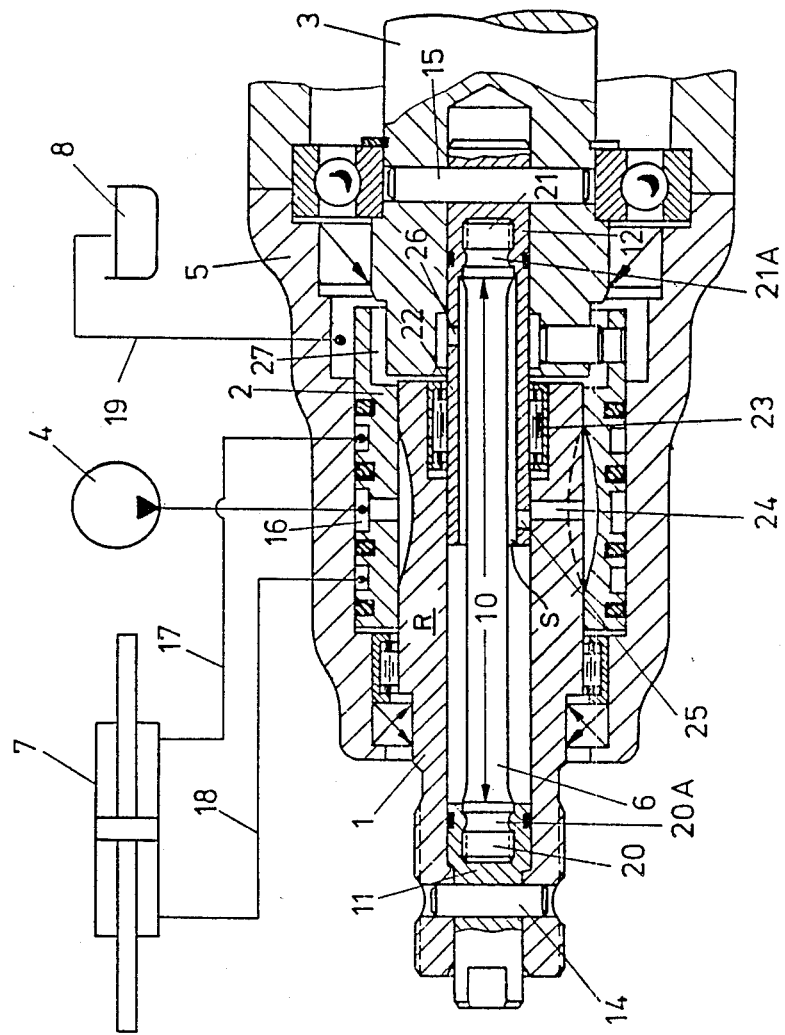

STEERING VALVE FOR VEHICLES

The invention is concerned with a steering valve for vehicles with torque input member for connecting to a steering column, and an output member for connection to a steering linkage through a torsion rod and being rotative between motion limit stops. The torsion rod has an average torsion area with a reduced cross section and connects at its ends.

BACKGROUND OF THE INVENTION

A steering control valve of the type described is shown in DE-PS 27 39 405, the U.S. counterpart being Tobias U.S. Pat. No. 4,387,737.

The operation is conventional in that friction of the vehicle front, or steered wheels on the ground result in torsional twist of the torque rod which causes relative rotation between valve elements to permit pressure flow to one side of a double acting servomotor, while exhausting the other side, dependent on direction of steering, to actuate a steering mechanism.

Another arrangement for operation is shown in Elser U.S. Pat. No. 4,198,898 (DE PS 27 39 405).

The torsion section of the torsion rod primarily determines the overall length of the steering valve. However, since the respective ends of the torsion rod must connect with the torsion area, the overall length necessarily becomes larger. A specific length is necessary in order to take into account the input shaft or member and the output shaft.

BRIEF DESCRIPTION OF THE INVENTION

It is an object of the present invention to provide a steering valve with a torsion rod of the kind described hereinabove, as in the U.S. Pat. No. 4,387,737 to Tobias, but which provides for a shorter valve construction.

The object is achieved by having a torque rod of reduced cross section between end portions, which is not novel, per se, but wherein each end portion has a connecting member for connection to an input member at one end of the torque rod and to an output shaft at the other end of the torque member.

In particular, one of the connecting members is radially spaced from the torque rod to effect a bearing for the rotor of the rotary valve.

Another object of the invention is to take advantage of the spacing by having a throttle bore through the bearing which receives flow from a return passage in the valve rotor. The throttle bore reduces return pressure and quiets the operation of the valve. By such an arrangement, the construction herein differs from the Tobias patent and has an advantage thereover by way of valve size reduction, all as will be made clear from the detailed description subsequently to follow.

Thus, by using end portions which are very short and serve only for connection of the torsion rod to the connecting members, such connecting members take over the function of hitherto existing shafts. Economy in production is effected, since end portions and connecting members can be made from cheaper materials than the torsion rod itself, and which are easily machined and shaped. Additionally, torsion rods with a small initial diameter can be used.

A detailed description of the invention now follows, in conjunction with the appended drawing, which shows a longitudinal section through a rotary steering valve comprising an outer sleeve with an inner rotor, having suitable coacting grooves for flow control of a servomotor upon relative rotation of the two valve components.

The details of the invention are illustrated in the aforementioned connecting ends, particularly the connecting end at the output shaft, which is extended inwardly over a portion of the torsion area of the torsion rod spacedly.

In general, rotary steering valves of the kind shown are basically known, comprising inner and outer relatively rotative components, and their operation is ell known.

Referring now to the drawing, a rotary valve 1 is shown, comprising the outer sleeve 2 which encompasses a rotor R and an output shaft 3, or other member to actuate steering such as can be supplied with pinion (not shown) for operating a steering rack (not shown),. The pump 4 provides pressure oil to the valve housing 6 encompassing the above components with an annular channel 16. Channel 16 distributes oil to the various grooves in the rotor R, which has a function of the steering valve 1 coacting with the outer sleeve 2 having the ducts 17 and 18 that lead to a servomotor 7. A return flow duct 19 leads to a tank 8 for exhaust oil return.

The torsion rod 6 with the free torsion area length 10, indicated by two arrows, forms the central component of the steering valve in conjunction with other components now to be described.

Thus, the torsion rod has integral end portions 20 and 21, which are relatively short with a slightly larger diameter than the diameter of the torsion rod in the length 10. The two end portions 20 and 21 are of sufficient strength to secure the torsion rod and may be profiled, e.g., knurled or keyed outer surfaces to be secured to respective connecting members. Also, as seen in the drawing, a peripheral rib of each end portion may extend into a respective groove, 20 and 21a, of the end portions 20 and 21, which secures the connecting members 11 and 12 against axial displacement on the torsion rod 6.

In assembly, the connecting members 11 and 12 are provided with transverse bores in which respective pins 14 and 15 are inserted for an interlocking securement with the rotor R of the rotary valve 1 and the output shaft 3.

The connecting member 11 is located on the steering wheel torque input side in any suitable fashion, such as being a part of a steering shaft or connected with the lower end of a steering shaft.

The connecting member 12 on its respective side forms the support for the rotor of the rotary valve 1. For that purpose, it has an extended bearing portion 22 which supports the rotor of the rotary valve 1.

As shown in the drawing, the bearing 22 is extended beyond the connecting portion 12 and over a portion of the torsion area 10. It will be noted that the bearing is in the form of a sleeve which is radially spaced with the spacing S from the torsion bar. The bearing 22 has a supplemental bearing such as a needle bearing 23 for further support of the rotor of the rotary valve 1 on the bearing 22.

It will, of course, be understood that other types of bearings for such purpose can be used.

As shown, the bearing 22 is extended beyond the conventional return flow bore 24 in the rotor R of the rotary valve 1, and in such case, a throttle or flow restrictor can be provided between the inner wall of the rotor of the rotary valve 1 and the bearing 22. Thus, the bearing wall has throttle bore 25 overlapping and in flow communication with the flow area of the return bore 24 in the rotor. The space S serves to conduct flow from the throttle bore 25 to an an ingress bore 26 in the wall of bearing 22 and thence to duct 19 outwardly of the steering valve.

Such flow could place outwardly of the valve in any way whatsoever. However, advantage of the construction is taken by providing the second return bore 26 which takes flow from throttle bore 25 via spacing S and directs it to an annular channel 27 to duct 19 to the tank.

The overlap contiguity of bores 24 and 25 will be understood to provide a variable restriction of flow area with relative rotation between the rotor R and sleeve 2 during a steering operation so as to vary the reduction of flow pressure progressively to aid in quieting the hissing noise. Actually, the rotary valve inherently has a quieting effect upstream of bores 24 and 25 as have all rotary valves of this kind wherein flow grooves of relatively rotative components provide a varying flow area overlap during a steering operation.

Thus, the rotary valve itself is an existing first stage of reduction while the present invention provides a subsequent or second stage of pressure reduction.

We claim:

1. In a vehicle steering valve of the kind having a torque input member (1) for connection to a steering wheel and comprising a valve rotor (R) within a valve sleeve (2) which connects to an output member (3) for steering actuation and a torque rod (6) transmits torque for said input member to said output member between limit stops with relative rotation of said valve rotor and valve sleeve to control flow to and from a servomotor; and wherein said torque rod has a reduced cross section (10) between end portions (20, 21) at respective ends of said reduced section; the improvement comprising connecting members (11, 12) having portions gripping respective end portions of said torque rod with one said connecting member (11) being connected to said input member and the other said connecting member (12) being secured to said output member (3); said other connecting member (12) having an extended portion as a bearing (22) within said valve rotor beyond the respective end portion (21) of said torque rod and extending into the torsion area of said torque rod for support of said valve rotor.

2. In a vehicle steering valve as set forth in claim 1, said extended portion having a spacing (S) around said torque rod (6); return flow passage means in said steering valve comprising said spacing.

3. In a vehicle steering valve as set forth in claim 1, including a supplemental bearing (23) on said bearing (22) and extending into said bearing for further support of said valve rotor.

4. In a vehicle steering valve as set forth in claim 2, including a needle bearing (23) on said bearing (22) for further support of said valve rotor.

5. In a vehicle steering valve as set forth in claim 2, said valve rotor (R) having a return passage (24); said bearing (22) having a throttle bore (25); whereby return flow passes through said return passage (24) to said throttle bore (25) and hence to said spacing (S); and egress means (26) including said spacing (S) to conduct said return flow outwardly to a tank whereby such return flow is quieted by pressure reduction in passing through said throttle bore (25).

6. In a vehicle steering valve as set forth in claim 5, said egress means comprising a bore (26) in said bearing (22) leading from said spacing (S) therefrom, whereby a reduction of return pressure occurs for quieting return flow.

7. In a vehicle steering valve as set forth in claim 5, wherein said return passage (24) comprises a bore having direct flow continuity with said throttle bore (25) whereby the cross section area of passage of flow between said bores is variable dependent upon the angle of rotation between the valve rotor (R) and bearing (22).

8. In a vehicle steering valve of the kind having a torque input member (1) for connection to a steering column and comprising a valve rotor (R) within a valve sleeve (2) which connects to an output member (3) for steering actuation and a torque rod (6) transmits torque from said input member to said output member between limit stops with relative rotation of said valve rotor and valve sleeve to control flow to and from a servomotor; and wherein said torque rod has a reduced cross section (10) between end portions (20, 21) at respective ends of said reduced section; the improvement comprising connecting members (11, 12) having portions gripping respective end portions of said torque rod with one said connecting member (12) being connected to said input member and the other said connecting member (12) effecting a bearing (22) within said valve rotor for support of said valve rotor.

9. In a vehicle steering valve as set forth in claim 8, said other connecting member having an inner spacing (S) with respect to torque rod (6); and return flow passage means in said steering valve comprising said spacing.

10. In a vehicle steering valve as set forth in claim 8, said valve rotor (R) having a flow return passage (24); said bearing (22) having a throttle bore (25) downstream of said return passage (24) for quieting the noise of return flow therethrough; including egress means (S, 26) communicating with said throttle bore (25) for return flow outwardly of said steering valve.

11. In a vehicle steering valve as set forth in claim 10, said egress means comprising another bore (26) in said bearing (22) leading from said spacing (S).

12. In a vehicle steering valve as set forth in claim 10, wherein said return passage (24) comprises a bore having direct flow continuity with said throttle bore (25) whereby the cross section area of passage of flow between said bores is variable dependent upon the angle of rotation between the valve rotor (R) and bearing (22) during steering.

* * * * *